Figure 1:
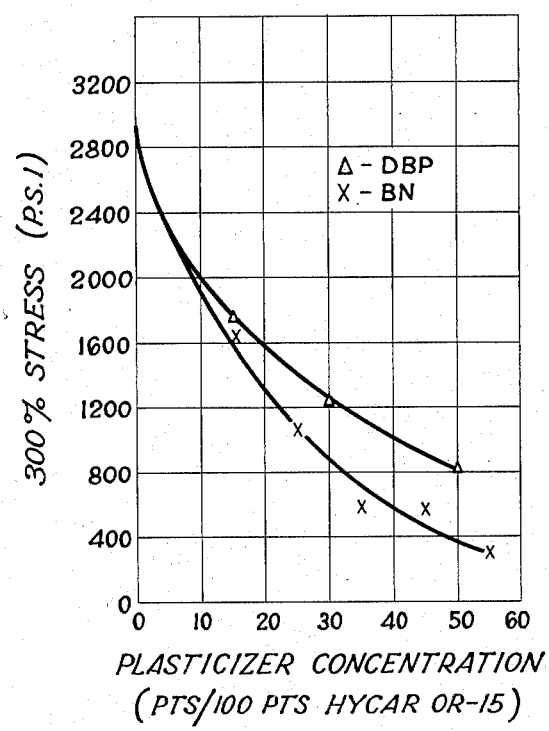

INVENTOR.
Preston L. Brandt

Patented Aug. 26, 1952

2,608,544

UNITED STATES PATENT OFFICE 2,608,544

PLASTICIZED BUTADIENE-ACRYLONITRILE COPOLYMERS

Preston L. Brandt, La Marque, Tex., assignor to Pan American Refining Corporation, Texas City, Tex., a corporation of Delaware Application December 28, 1949, Serial No. 135,387

4 Claims. (Cl. 260—33.6)

This invention relates to a process for plasticizing rubbery butadiene-acrylonitrile copolymers and to the resultant novel compositions.

It is well known that the butadiene-acrylonitrile copolymer rubbers, hereinafter referred to as nitrile rubbers, which contain between about 15 and about 50 percent by weight of acrylonitrile chemically combined in the copolymeric rubber product, are generally less thermoplastic and tougher than natural rubber and therefore require the presence of softeners or plasticizers for proper processing and to improve resilience, extensibility and resistance to freezing. With the commercialization of nitrile rubbers a considerable number of plasticizing agents, therefore, have been proposed, tested and employed, but all of them have suffered from one or more of the disadvantages of relatively low plasticizing efficiency, high cost, poor compatibility with nitrile rubber, etc. Probably the most commonly employed plasticizer, alone or together with added materials such as tars or pitches, in the compounding of nitrile rubbers, has been dibutyl phthalate, which represents one of the outstanding ester-type plasticizers.

It is an object of my invention to provide a novel method for plasticizing nitrile rubbers. Another object of my invention is to provide plasticized nitrile rubber products of great commercial value. An additional object of my invention is to provide an improved hydrocarbon-type plasticizer for nitrile rubbers. These and other objects of this invention will become apparent from the ensuing description thereof.

Briefly, I have discovered highly efficient and economical plasticizers for nitrile rubbers, comprising essentially mono- and/or di-butylated mono- and/or di-methylnaphthalenes. A method for the preparation of butylated methylnaphthalenes suitable for use in accordance with the present invention has been described in U. S. Patent 2,462,792 of F. T. Wadsworth and R. J. Lee, patented February 22, 1949, although it should be understood that the above-described butylated methylnaphthalenes may be employed in the present invention regardless of how they are prepared.

Typical properties of butylated methylnaphthalenes, which in this case were derived by the butylation of hydroformer bottoms fractions containing mono- and di-methylnaphthalenes, are set forth in the following table.

TABLE 1

Properties of mixtures of mono- and dibutyl-, mono- and dimethylnaphthalenes

Typical inspection:

|  | Minimum | Maximum |
|---|---|---|
| Gravity, °API | 14.5 | 15.9 |
| Specific Gravity, 60/60 | 0.9692 | 0.960 |
| Color, ASTM | 3 | 2½ |
| ASTM Distillation, °F.: |  |  |
| IBP | 556 | 610 |
| 10% | 576 | 639 |
| 20 |  | 642 |
| 30 | 588 |  |
| 50 | 600 | 658 |
| 70 | 620 |  |
| 80 |  | 693 |
| 90 | 670 |  |
| FBP | 733 | 741 |
| Viscosity: |  |  |
| S. S. U. at 100° F | 103 | 425 |
| Centistokes at 100° F |  | 92.0 |
| Refractive Index $n_D^{23}$ | 1.5763 |  |
| Refractive Index $n_D^{25}$ |  | 1.5648 |

Inspections on other butylated naphthalenes which were prepared are given in Table II of U. S. Patent 2,462,792.

The nitrile rubbers plasticized in accordance with this invention may, as pointed out above, contain between about 15 and about 50 percent by weight of acrylonitrile prior to the addition of the plasticizer and prior to vulcanization; however, my invention is particularly applicable to nitrile rubbers containing a relatively high proportion of combined acrylonitrile, say between about 30 and about 45 percent by weight, calculated prior to the addition of plasticizer and prior to vulcanization. The proportion of butylated methylnaphthalene plasticizer will, in general, vary between about 5 and about 60 percent by weight, based on the nitrile rubber prior to vulcanization, and is preferably between about 25 and about 40 percent by weight in the usual case. The specific proportion of plasticizer employed in any given case will necessarily be dependent upon the precise properties desired in a particular nitrile rubber product. The plasticizer may be added to the nitrile rubber by a variety of methods, for example by use of a roll mill, Banbury mixer, etc.

The following examples are presented in order to illustrate but not unnecessarily to limit my invention. Hycar OR–15, a commercial product of the B. F. Goodrich Chemical Company, containing 45 weight percent of combined acrylonitrile, was selected as the base stock and the effects of butylated methylnaphthalene plasticizers therein were studied and compared with the effects exerted by dibutyl phthalate. A master batch containing all the ingredients except the accelerator and plasticizer was prepared by mixing the ingredients on a 6 inch by 12 inch rubber mill whose rolls were kept cool by circulating water. The recipe for the master batch is given below and the ingredients were added in the order in which they are named.

|  | Parts by wt. |
|---|---|
| Hycar OR–15 | 100 |
| Easy processing channel black (Wyex) | 50 |
| Zinc oxide | 5 |
| Stearic acid | 0.5 |
| Phenyl beta-naphthylamine | 1 |
| Sulfur | 1.5 |
|  | 158 |

After the master batch was mixed, the required amount of plasticizer and 1.5 parts benzothiazyl disulfide per 100 parts of Hycar OR–15 were added to portions of the master batch on the rubber mill. The batch size was kept at 525 g. for all concentrations of plasticizer.

The properties of the butylated methylnaphthalenes (a mixture of mono- and di-methylnaphthalenes) employed in the following examples are set forth in the table immediately below:

TABLE 2

| | |
|---|---|
| Gravity, °API | 14.7 |
| Specific gravity, 60/60 | .968 |
| Color, ASTM | 1+ |
| Boiling range | 635° F.–662° F. at 760 mm. |
| Viscosity, SSU at 100° F | 210 |
| Centistokes at 100° F | 45.3 |
| Refractive index $n_D^{25}$ | 1.5688 |
| Aromatic content (by sulfonation) | 98+% |
| Bromine No | 0.6 |

The butylated methylnaphthalenes plasticizer was added in the proportions of 15, 25, 35, 45 and 55 parts by weight per 100 parts by weight of the nitrile rubber. The dibutyl phthalate plasticizer was added in proportions of 15, 30 and 50 parts by weight per 100 parts by weight of the nitrile rubber. After milling in the plasticizers, the plasticized materials were afforded a rest period of 24 hours and were then remilled and vulcanized for 5, 10, 20 and 40 minutes at 310° F. in accordance with ASTM procedures. The results obtained in the test are presented in the following table.

TABLE 3

| Test No. | Plasticizer | Publicizer Concentration, Parts | Min. to Add Plasticizer | Tack | Plasticity Number (.001 in.) | Recovery Number (.001 in.) | Tensile Strength, p. s. i. | 300%Stress, p. s. i. |
|---|---|---|---|---|---|---|---|---|
| 1 | None | 0 | 0 | None | 138 | 153 | 3,200 | 3,080 |
| 2 | [1] BN | 15 | 15 | Fair | 121 | 129 | 2,880 | 1,620 |
| 3 | BN | 25 | 35 | ...do | 113 | 121 | 2,440 | 1,060 |
| 4 | BN | 35 | 69 | Fair+ | 94 | 100 | 2,050 | 580 |
| 5 | BN | 45 | 80 | Poor– | 88 | 91 | 1,970 | 550 |
| 6 | BN | 55 | 90 | None | 75 | 75 | 1,370 | 300 |
| 7 | [2] DBP | 15 | 11 | Fair | 123 | 132 | 2,780 | 1,750 |
| 8 | DBP | 30 | 22 | Fair+ | 116 | 126 | 2,220 | 1,250 |
| 9 | DBP | 50 | 36 | Good | 90 | 95 | 1,470 | 810 |

NOTES:
(1) Cured 30 minutes at 310° F.
(2) Aging carried out for 72 hours at 100° C.
[1] Butylated methylnapthalenes.
[2] Dibutyl phthalate.

| Test No. | Ultimate Elongation, Percent | Hardness (Rex A) | Aged— Tensile Strength, p. s. i. | Aged—300 Percent Stress, p. s. i. | Aged— Ultimate Elongation, Percent | Aged— Hardness (Rex A) | Aged— Weight Loss, Percent | Aged— Plasticizer Loss, Percent |
|---|---|---|---|---|---|---|---|---|
| 1 | 310 | 75 | 3,170 |  | 200 | 80 | 0.7 | 0 |
| 2 | 450 | 65 | 3,320 |  | 265 | 77.5 | 7.6 | 81 |
| 3 | 530 | 57.5 | 3,210 |  | 300 | 75 | 11.2 | 81 |
| 4 | 600 | 50 | 3,140 | 3,210 | 325 | 72.5 | 16.2 | 86 |
| 5 | 590 | 42.5 | 2,760 | 3,140 | 300 | 70 | 18.3 | 80 |
| 6 | 610 | 32.5 | 2,850 | 2,760 | 360 | 67.5 | 23.8 | 91 |
| 7 | 410 | 65 | 3,540 | 2,850 | 255 | 77.5 | 7.6 | 81 |
| 8 | 410 | 55 | 3,390 |  | 300 | 72.5 | 13.5 | 81 |
| 9 | 420 | 42.5 | 2,890 | 3,390 | 325 | 72.5 | 21.8 | 89 |
|  |  |  |  | 2,890 |  |  |  |  |

An inspection of the plasticized stocks after 24 hours showed no indication of the butylated methylnaphthalenes plasticizer "sweating out."

The tack of the plasticized stocks 24 hours after compounding was qualitatively measured by pressing two fresh rubber surfaces together and estimating the force necessary to separate them. The results shown in Table 3 are the consensus of two observers. At the higher concentrations of plasticizers, butylated methylnaphthalene-containing stocks do not appear to have as much tack as dibutyl phthalate-containing stocks.

Plasticity measurements were made with a Williams plastometer approximately 24 hours after compounding. The plastometer is operated in an oven at 70° C. The sample, a 22-cc.-volume right cylinder of approximately 4-cm. diameter, is placed in the oven between 2 sheets of cellophane to condition for 15 minutes. The sample is then inserted between the plates of the plastometer and the upper plate, weighing 5 kg. is lowered on the sample. After 3 minutes, the thickness is read from a gauge attached to the plastometer. The sample is removed and allowed to cool for 15 minutes at room temperature, after which the thickness is measured, to obtain the recovery number. The results show that plasticity increases (plasticity number decreases) with increasing BN content more than with DBP. BN also produces stocks with lower recovery than those produced by the other two plasticizers. This means that BN is a more efficient plasticizer.

Stress-strain properties of the vulcanized stocks were measured on a Scott rubber tester in accordance with A. S. T. M. procedures. Only the results at the 40-minute curves are shown in Table 3 because the 40-minute curves were approximately optimum in all cases, as judged by tensile strength, stress at 300% elongation, ultimate elongation, and hand selection. There was some evidence that increased plasticizer concentration retarded the curves to some extent, but in all cases the tensile strength had reached the relatively flat portion of the strength-time curves by 40 minutes. BN was more noticeable in its retarding effect than DBP.

Reduction in stress with increasing plasticizer concentration is perhaps the best single criterion of plasticizing efficiency of a given plasticizer in vulcanized rubbers. In other words, a good plasticizer reduces stress values without unduly reducing tensile strength, and, at the same time, increases ultimate elongation. Figure 1 shows the 300% stress values, taken from Table 3 plotted against plasticizer concentration. BN reduces stress more effectively than DBP.

Figure 2:
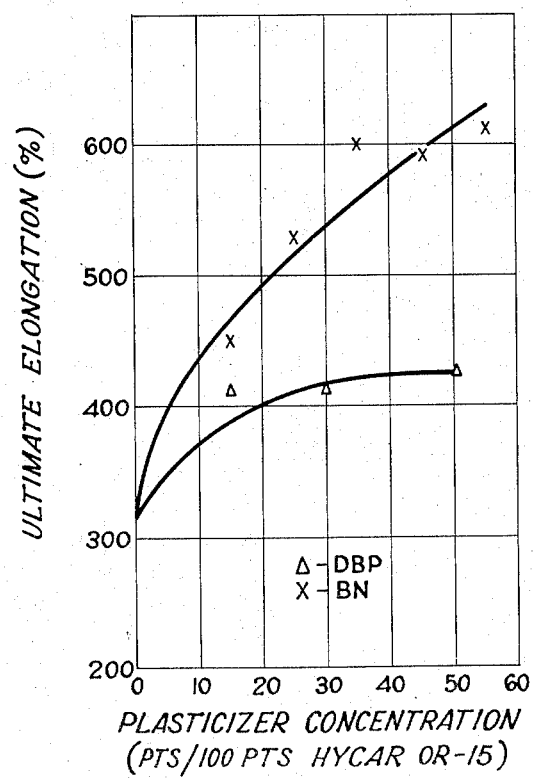

Ultimate elongations are given in Figure 2. At a given plasticizer concentration, BN-plasticized stocks have much higher elongations than do DBP-plasticized stocks.

Stress-strain samples were aged in a forced-circulation oven for 72 hours at 100° C. After the aging period the samples were tested on the Scott rubber tester for changes in stress-strain properties. The data are shown in Table 3. DBP-plasticized stocks show less change on aging than do BN stocks. As the original plasticizer content is increased, the change in properties upon aging increases. This is undoubtedly due to loss of plasticizer on heat aging. It is interesting that the tensile strengths of some of the aged plasticized stocks are higher than the aged unplasticized control. This effect is probably connected with continued cure during the aging process.

Volatility measurements were made by weighing the .075 in.-thick stress-strain specimens before and after aging on an analytical balance. In this test, DBP and BN were about equally volatile. The percentage of plasticizer lost in this test seems to be independent of the amount originally present.

Hardness measurements made with a Rex A hardness before and after aging 72 hours at 100° C. are shown in Table 3. BN produces softer vulcanizates than DBP at a given plasticizer concentration.

The butylated methylnaphthalene plasticizers may be employed jointly with other plasticizers, e. g., ester-type plasticizers such as dibutyl phthalate, tricresyl phosphate, or other types of plasticizers such as coumarone-indene resins, hydrocarbon pitches, etc. The coplasticizers may be employed with butyl methylnaphthalenes in proportions ranging between about 10 and about 200 weight percent, based upon the weight of butylated methylnaphthalene plasticizer. In addition, the plasticized nitrile rubbers may also contain various fillers, antioxidants, pigments, sun-checking agents, reenforcing materials, etc.

Having thus described my invention, what I claim is:

1. A plasticized composition comprising a butadiene-acrylonitrile rubber and a substituted naphthalene containing methyl and butyl substituents, said substituted naphthalene containing not less than 5 and not more than 10 side-chain carbon atoms per molecule.

2. A plasticized composition comprising a butadiene-acrylonitrile rubber and between about 5 and about 60 percent by weight, based on said rubber, of a substitued naphthalene containing methyl and butyl substituents, said substituted naphthalene containing not less than 5 and not more than 10 side-chain carbon atoms per molecule.

3. A plasticized composition comprising a butadiene-acrylonitrile rubber containing between about 15 and about 50 percent by weight of combined acrylonitrile, and between about 5 and about 60 percent by weight, based on said rubber, of a substituted naphthalene containing methyl and butyl substituents, said substituted naphthalene containing not less than 5 and not more than 10 side-chain carbon atoms per molecule.

4. A plasticized composition comprising a butadiene-acrylonitrile rubber containing between about 30 and about 45 percent by weight of combined acrylonitrile, and between about 10 and about 50 percent by weight, based on said rubber, of a substituted naphthalene containing methyl and butyl substituents, said substituted naphthalene containing not less than 5 and not more than 10 side-chain carbon atoms per molecule.

PRESTON L. BRANDT.

REFERENCES CITED

The following references are of record in the file of this patent:

UNITED STATES PATENTS

| Number | Name | Date |
| --- | --- | --- |
| 2,115,896 | Wiezevich | May 3, 1938 |
| 2,413,259 | Soday | Dec. 24, 1946 |
| 2,477,717 | Brandt | Aug. 2, 1949 |